United States Patent [19]
Yamazaki

[11] Patent Number: 5,282,217
[45] Date of Patent: Jan. 25, 1994

[54] LIGHT SOURCE DRIVING APPARATUS AND SYSTEM UTILIZING THE SAME

[75] Inventor: Tatsuya Yamazaki, Zushi, Japan

[73] Assignee: Canon Kabushiki Kaisha, Tokyo, Japan

[21] Appl. No.: 719,934

[22] Filed: Jun. 24, 1991

[30] Foreign Application Priority Data

Jun. 26, 1990 [JP] Japan ............... 2-167548

[51] Int. Cl.⁵ ............................... H01S 3/13
[52] U.S. Cl. .......................... 372/31; 372/27; 372/38; 372/106; 359/495
[58] Field of Search ............... 372/29–32, 372/106, 38, 27; 359/495

[56] References Cited

U.S. PATENT DOCUMENTS

| | | | |
|---|---|---|---|
| 4,443,695 | 4/1984 | Kitamura | 250/205 |
| 4,581,617 | 4/1986 | Yoshimoto et al. | 346/108 |
| 4,821,273 | 4/1989 | Hori | 372/32 |
| 4,844,584 | 7/1989 | Miyagawa | 359/495 |
| 4,942,584 | 7/1990 | Karaki et al. | 372/31 |
| 4,945,541 | 7/1990 | Nakayama | 372/31 |
| 4,967,417 | 10/1990 | Yamada | 372/31 |
| 5,040,896 | 8/1991 | Moslehi | 372/32 |
| 5,042,042 | 8/1991 | Hori et al. | 372/32 |

FOREIGN PATENT DOCUMENTS

| | | |
|---|---|---|
| 0174729 | 3/1986 | European Pat. Off. . |
| 0179554 | 4/1986 | European Pat. Off. . |
| 3102185 | 11/1981 | Fed. Rep. of Germany . |
| 3400317 | 7/1986 | Fed. Rep. of Germany . |

*Primary Examiner*—Léon Scott, Jr.
*Attorney, Agent, or Firm*—Fitzpatrick, Cella, Harper & Scinto

[57] ABSTRACT

A driving apparatus for a light source is provided with a light generating unit including a light source which emits a light component polarized in a first predetermined direction and another light component polarized in a second, perpendicular direction. The first and second light components are emitted in amounts which vary depending on the total emitted light output. A light splitter is provided for splitting the two polarized components in different splitting ratios into first and second light paths. A photodetector detects the light intensity in the first light path, and a control unit controls the light generating unit so as to maintain the light intensity in the second light path at a predetermined state based on the detection output of the photodetector.

30 Claims, 4 Drawing Sheets

LIGHT SOURCE DRIVING APPARATUS AND SYSTEM UTILIZING THE SAME

BACKGROUND OF THE INVENTION

1. Field of the Invention

The present invention relates to a light source driving apparatus for monitoring a part of the light emitted from a light source such as a semiconductor laser and controlling said semiconductor laser based on the result of said monitoring, thereby achieving APC control for maintaining a constant light quantity or modulation control for obtaining a desired exposure, and to a system such as an image recording apparatus utilizing said light source driving apparatus.

2. Related Background Art

A semiconductor laser light source tends to show unstable light output for example, because of temperature change. Particularly, when such semiconductor laser is employed as the light source of a scanning optical system requiring a predetermined output intensity such as in a laser beam printer, it is necessary to effect so-called APC (automatic power control) by splitting and monitoring a part of the emitted light and effecting feedback on the drive current to maintain a predetermined light output.

The light emitted from a semiconductor laser is generally a mixture of the laser oscillated light linearly polarized in an oscillating direction parallel to the active layer and the LED oscillated light randomly polarized in all the directions, and, since the proportion of the laser oscillated light increases rapidly when the drive current exceeds the threshold value of laser oscillation as shown in FIG. 8, the ratio of mutually orthogonal polarized components is variable depending on the magnitude of the drive current.

For this reason, when the conventional APC is performed by splitting a part of the light emitted from the semiconductor laser, the monitoring light beam has been obtained, as disclosed in the U.S. Pat. No. 4,844,584, in such a manner that so-called non-polarizing beam splitter S capable of splitting mutually orthogonal polarized components in same proportions is employed as shown in FIG. 9, and a photodetector D is located on a split optical path LR. An alternative method has been obtained in which only a specified polarized light component is taken out from the emitted light by, for example, a polarizing beam splitter, and then a monitoring light beam is obtained from said polarized component by an ordinary beam splitter, thereby maintaining a constant ratio between the monitoring light beam and the light output.

On the other hand, in the U.S. patent application Ser. No. 584,263 filed on Sep. 18, 1990, a method for modulating the semiconductor laser have been proposed in which the laser is capable of providing a desired exposure regardless of variation in temperature, without relying on the APC mentioned above. An outline of one embodiment of said proposed method is such that the semiconductor laser is driven with a waveform whose output of light gradually increases, a part of said light output is monitored by a photodetector, and the output of the laser is allowed to increase until it reaches a predetermined value corresponding to the desired exposure.

However, the non-polarizing beam splitter and the polarizing beam splitter mentioned above require extremely complex manufacturing steps for obtaining special characteristics, in comparison with those for the ordinary beam splitter (splitting two polarized components with different proportions). For example the splitting face of these beam splitters is generally composed of multi-layered optical thin films, which, requiring at least 7 to 8 layers, cannot easily provide uniform characteristics and involve a high production cost.

In the non-polarizing beam splitter, satisfactory characteristics may be obtained with a single-layered thin metal film, but the film thickness in such case has to be strictly controlled, for example, in a range of several nm to over 10 nm, and the formation of such thin film in uniform manner is extremely difficult.

Also, the above-explained structure employing the polarizing beam splitter requires another beam splitter, so that it not only elevates the production cost of the entire apparatus but also deteriorates the efficiency of utilization of the emitted light.

Furthermore, even if the intensity ratio of the emitted light and the monitoring light can be always maintained constant, the monitoring light becomes proportionally weaker if weak emitted light is desired, so that S/N ratio of the detection signal from the photodetector becomes low to hinder adequate feedback control.

SUMMARY OF THE INVENTION

In consideration of the foregoing, an object of the present invention is to provide a light source driving apparatus capable of achieving both reduction in cost and improvement in performance at the same time, and a system utilizing said driving apparatus.

Another object of the present invention is to provide a light source driving apparatus capable of achieving cost reduction by the use of inexpensive light splitters such as an ordinary beam splitter or an ordinary prism, improvement in S/N ratio of the monitoring light at a low light emission intensity, and improvement in extinction ratio of the emitted light.

Still another object of the present invention is to provide a light source driving apparatus capable of achieving cost reduction by the use of inexpensive light splitters such as an ordinary beam splitter or an ordinary prism, and control of the quantity of the output light from the light source with precision and with a high resolving power.

Still another object of the present invention is to provide a system, such as an image recording apparatus, utilizing the abovementioned light source driving apparatus.

DESCRIPTION OF THE PREFERRED EMBODIMENTS

The present invention will be explained in detail by embodiments shown in accompanying drawings.

First Embodiment

Figure 1:
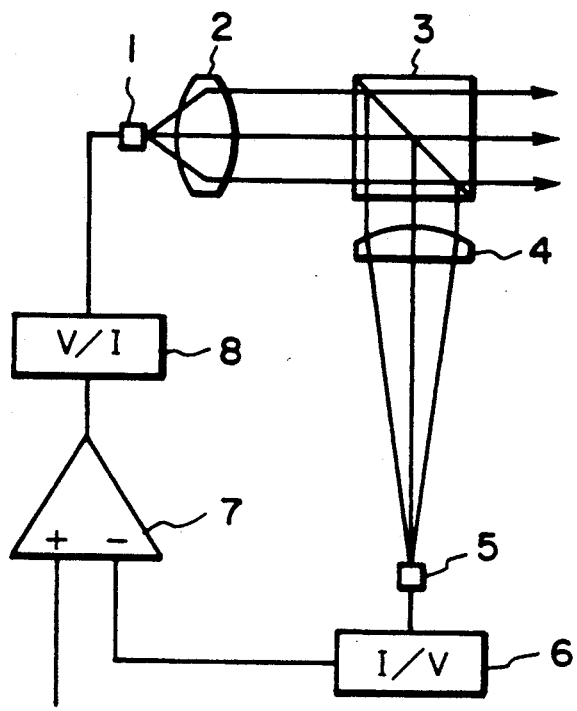
FIG. 1 is a schematic view of an embodiment of the present invention.

Referring to FIG. 1, in front of a semiconductor laser light source 1 there is provided a collimating lens 2, whereby a divergent light beam emitted from said semiconductor laser light source 1 is converted into a parallel light beam. It is assumed that said light source 1 is so positioned that the junction plane of its active layer is perpendicular to the plane of drawing. Thus converted laser beam is split into an outgoing light linearly transmitted and a monitoring light rectangularly reflected, by means of a beam splitter 3 having the characteristics to be explained later. The present embodiment employs a prism-shaped beam splitter, but there may also be utilized a plate-shaped beam splitter. The monitoring light beam split by reflection is concentrated by a condenser lens 4 onto a photodetector 5. After the output current of said photodetector 5 is converted by a current-voltage converter 6 into an appropriate voltage, the voltage is supplied to a voltage comparator 7 in which the voltage is compared with a reference input voltage composed of a light source drive signal such as pixel data corresponding to pixel density. The voltage comparator 7 is of a type capable of increasing/decreasing the input reference voltage by comparison of two input voltages to thereby output, and effects current drive of the semiconductor laser light source 1 through a voltage-current converter 8.

The above-explained arrangement performs so-called APC in which the intensity of the monitoring light beam detected by the photodetector 5 is compared with a predetermined intensity corresponding to the voltage of the drive signal by means of the voltage comparator 7, and the light output is maintained at a predetermined intensity by a feedback operation for increasing the drive current if the detected intensity is deficient or inversely decreasing the drive current if the detected intensity is excessive.

Since the polarization ratio of the semiconductor laser light source 1 is variable depending on the emitted light intensity as explained above, the intensity ratio of the outgoing light to the monitoring light is not constant in the ordinary beam splitter employed in the present embodiment, of which reflectance and transmittance depend on the polarized state. In the following description, the light polarized parallel to the plane of drawing will be called p-polarized light, while that polarized perpendicularly to said plane will be called s-polarized light thus distinguishing both lights. When the junction plane of the active layer of the semiconductor laser 1 is perpendicular to the plane of drawing, the laser oscillated light is mostly composed of s-polarized light, while the LED oscillated light is a random polarized light, that is a disordered polarized light containing p- and s-polarized lights in about same proportions.

The light quantity ratio R of the quantity Pa of monitoring light reflected at the beam splitter 3 to the quantity Po of output light linearly transmitted through the beam splitter 3 can be represented as follows:

$$R = \frac{Pa}{Po} = \frac{P_p \cdot R_p + (P - P_p) \cdot R_s}{P - \{P_p \cdot R_p + (P - P_p) \cdot R_s\}}$$

where P is the total outgoing quantity of light emitted by the semiconductor laser 1; $P_p$ is the quantity of p-polarized component in said total outgoing quantity of light emitted; and $R_p$ and $R_s$ are reflectances of the beam splitter 3 for the p- and s-polarized components, respectively.

In order to investigate the change in the light quantity ratio R as a function of the total outgoing (emitted) light quantity P, R is differentiated by P to obtain the following equation. It is assumed that $\delta P_p/\delta P \approx 0$, because the quantity $P_p$ of the p-polarized light scarcely changes by the change in the total emitted light quantity P:

$$\frac{dR}{dP} = \frac{P_p(R_s - R_p)}{\{P(1 - R_s) + P_p(R_s - R_p)\}^2}$$

As the denominator of this equation is always positive, in response to the increase in the total emitted light quantity P, the light quantity ratio R (1) monotonously increases in case of $R_s > R_p$, or (2) monotonously decreases in case of $R_s < R_p$. Thus, in case of (1), the proportion of the monitoring light quantity Pa decreases when the total emitted light quantity P is small, but the situation is inversed in case of (2). The light quantity ratio R becomes constant in case of $R_s = R_p$, and this state corresponds to the non-polarizing beam splitter mentioned before.

Figure 2:
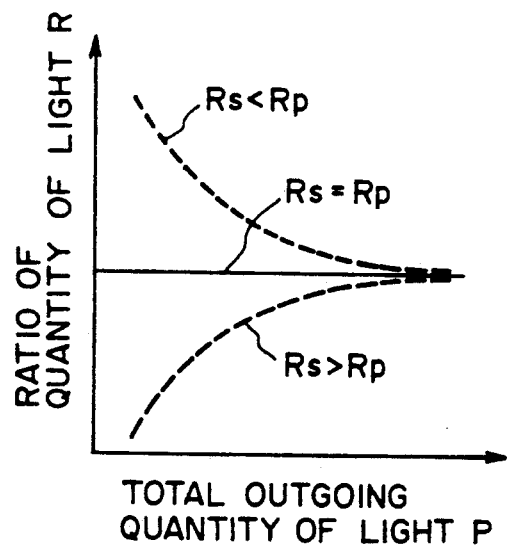
FIG. 2 is a graph showing characteristics of beam splitter.
Figure 3:
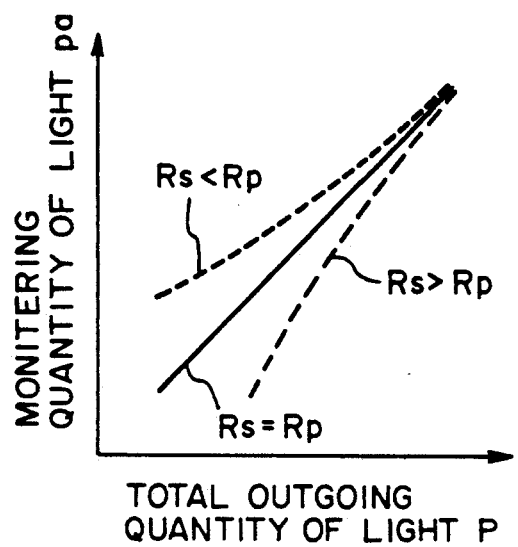
FIG. 3 is a graph showing characteristics of beam splitter.

These situations are illustrated in graph in FIGS. 2 and 3. FIG. 2 shows the light quantity ratio R in the ordinate as a function of the total outgoing (emitted) light quantity P in the abscissa, while FIG. 3 shows the monitoring light quantity Pa in the ordinate as a function of the total emitted light quantity P in the abscissa. As will be apparent from these graphs a beam splitter with property $R_s < R_p$ allows a relative increase in the monitoring light quantity Pa when the total emitted light quantity P and the output light quantity Po are lower than those in the non-polarizing beam splitter, thereby improving the S/N ratio of photodetector 5. This is because, when the quantity of light from the laser light source 1 is weak and the oscillation state is shifted from the laser oscillated state to the LED oscillated state p-polarized light which is more easily reflected increases relatively thereby to show a relative increase in the monitoring light quantity. In this state the output light quantity Po shows a relative decrease, resulting in an increased extinction ratio. Thus, in case of image recording, image can be reproduced with higher contrast, and there can be obtained a halftone image with large gradation number (for example 4096 gradation). Furthermore, the beam splitter or prism of the above-mentioned characteristics can be relatively easily produced, with a low production cost.

Figure 4:
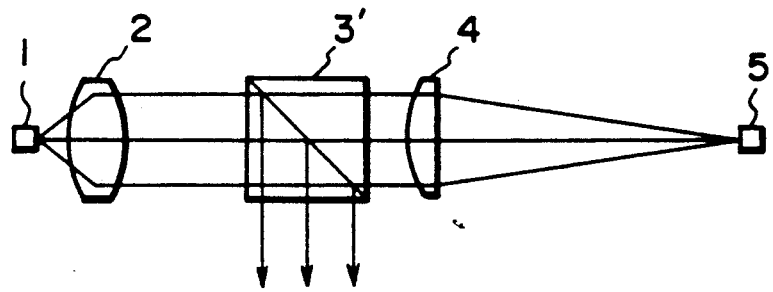
FIG. 4 is a schematic partial view of a modified embodiment.

FIG. 4 is a partial schematic view of a modification of the foregoing embodiment, wherein a beam splitter 3' provides 9 transmitted light beam as the monitoring light and a reflected light beam as the output light. The junction of the active layer of the semiconductor laser 1 is positioned perpendicularly to the light-splitting plane of said beam splitter 3'. In this case, if the beam splitter 3' has a property $R_s > R_p$, the monitoring light quantity Pa can be increased when the total emitted light quantity P and the output light quantity Po are small, whereby the advantages as mentioned in the foregoing embodiment are obtained. Since ordinary glass materials have the property $R_s > R_p$, the preparation of the beam splitter is even easier, with even lower cost, than said splitter 3 with property $R_s < R_p$.

In said both embodiments there is provided correction means for correcting non-linear characteristics of the beam splitter into linear. The non-linearity derived from not only characteristics of the beam splitter but also sensitivity characteristics of the recording medium, characteristics of the light source, characteristics of photodetector etc. The synthesized characteristics including the factors are preferably corrected linearly by the correction means. Said correction can be achieved, for example, by (1) correcting the reference voltage supplied to the voltage comparator 7 by means of a look-up table having a conversion characteristic capable of correcting said synthesized characteristics linearly, (2) giving predetermined non-linear conversion characteristics to the current-voltage converter 6 or the voltage-current converter 8 to correct linearly, or (3) providing a non-linear amplifier between the current-voltage converter 6 and the comparator 7 to correct linearly. Combinations of these methods may naturally be employed.

In the foregoing there has been explained a case in which the junction of the active layer of the semiconductor laser 1 is directed perpendicularly to the incident plane of the semiconductor laser 1 (perpendicularly to the plane of drawing), but the above-explained relationships can be varied by rotating the direction of the junction of the active layer of said semiconductor laser 1. For example, if the junction of the active layer of the semiconductor laser 1 exists in said incident plane in FIG. 1 (rotated by 90° from the direction relative to the foregoing embodiment), the characteristics of the beam splitter shown in FIGS. 2 and 3 are inverted. Thus, the above-mentioned effects can be obtained by employing a beam splitter of which characteristics are opposite to those in the foregoing embodiment. More specifically, in case of obtaining the monitoring light beam in the reflected path as shown in FIG. 1, there is employed a beam splitter with property $R_s > R_p$, and in case of obtaining the monitoring light beam in the linearly transmitted path as shown in FIG. 4, there is employed a beam splitter with a property $R_s < R_p$.

Also, the present invention can employ not only the semiconductor laser as shown in the foregoing embodiment, but also a light source which emits a light having mutually perpendicular polarized components with ratio of the components which is different depending on the total emitted light quantity. Examples of such light source include an Ar+ laser and a semiconductor-excited solid-state laser. This also applies to the following embodiments.

Second Embodiment

Said first embodiment achieves improvements in performance such as an increase in the S/N ratio on detection of the monitoring light beam at a small quantity of light emitted from the source and an increase in extinction ratio of the emitted light, by positioning a photodetector in a light path at which a polarized component, perpendicular to the junction plane of the active layer of the semiconductor laser, is split in larger proportion. In the embodiment shown in FIG. 1, a beam splitter with property $R_s < R_p$ is positioned as shown in FIG. 1.

On the other hand, the present embodiment employs a beam splitter of property $R_s > R_p$ in the same arrangement as shown in FIG. 1, or that of property $R_s < R_p$ in the same arrangement as shown in FIG. 4. Also, in this embodiment there is provided correction means for correcting the detected value of the monitoring light quantity Pa, in order to establish a linear relationship between the detected value and the output light quantity Pa.

The semiconductor laser driving apparatus of the present embodiment allows to detect the variation in the total emitted light quantity P with high sensitivity, namely with high resolving power. This is because, in FIG. 3, the characteristic curve of the beam splitter with property $R_s > R_p$ shows a steeper inclination (particularly when the total emitted light quantity P is small) than in other beem splitters, thus showing a larger change in the monitoring light quantity Pa for a given change in the total emitted light quantity P. Consequently, in the present embodiment it is possible to precisely control the light quantity from the semiconductor particularly when the total emitted light quantity P is small.

An example is given in which a halftone recording on a silver halide film is performed with a laser beam which is analog modulated according to recording data, employing a semiconductor laser driving apparatus of the above-explained structure combined with a semiconductor laser of a wavelength (λ) of 780 nm and a rated maximum light output of 10 mW. As the above-mentioned semiconductor laser effects laser oscillation at the light output not less than above 1 mW, the light quantity control is possible to a certain extent with the conventional control apparatus in a light output range from 1 mW to 10 mW (maximum). However, since the analog modulation in this range can only provide an extinction ratio (dynamic range) of 1:10, it is very difficult to record a halftone image of high definition on a recording material requiring a high extinction ratio such as a silver halide film. On the contrary, the semiconductor laser driving apparatus of the present embodiment provides a higher resolving power for the monitoring light quantity, and can therefore precisely control the output light quantity of the semiconductor laser, particularly in so-called LED light emission region with the light output of 1 mW or less, where the polarization ratio shows a large change. Thus, there can be obtained an extinction ratio of 1:20 or higher, so that halftone recording of high definition with a large gradation number (for example 4096 gradation) is rendered possible even on a recording medium requiring a high extinction ratio such as the silver halide film. As explained above, the present embodiment is advantageous for ordinary analog modulation.

In case a beam splitter with property $R_s > R_p$ is employed as the light splitting means, there can be achieved further cost reduction of the apparatus, since it is easiest to manufacture such beam splitter which can be made coating with only one layer to obtain desired performance.

Third Embodiment

The first and second embodiments show examples of APC for maintaining a constant output of the laser by feedback of the output of the photodetector 5, but the light source driving apparatus of the present invention is effective also in an apparatus without APC proposed in said U.S. patent application Ser. No. 584,263. An embodiment relating to such apparatus without APC will be explained in the following. More detailed structures are described in said patent application.

Also in the present embodiment, the structure is same as in FIG. 1 or 4, and the properity of the beam splitter is selected in the same manner as in the first or second embodiment. The semiconductor laser is modulated in the following manner.

Figure 5:
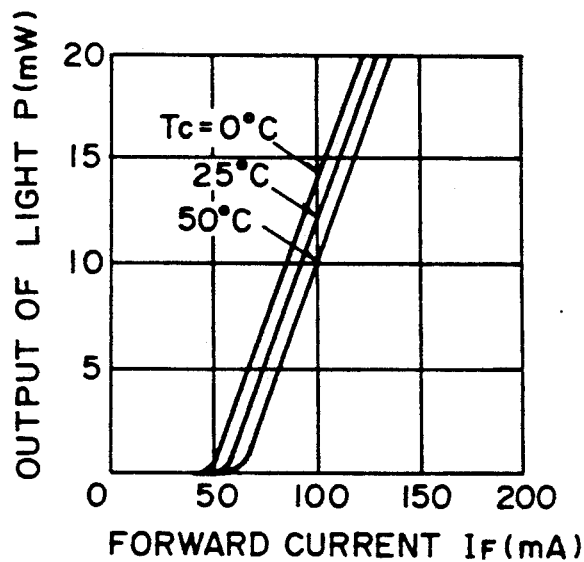
FIG. 5 is a graph showing light output vs. current characteristics of a semiconductor laser.

FIG. 5 shows the light output-current characteristic of a semiconductor laser. As apparent from FIG. 5, the slope efficiency $\eta$ [mW/mA] scarcely changes by the temperature. That is, the lines in FIG. 5 are made with parallel displacement by a change in the temperature. Though certain semiconductor lasers show some change in the slope efficiency, any semiconductor laser of which slope efficiency can be regarded as constant at least within the temperature range of use can be employed in this embodiment.

Figure 6:
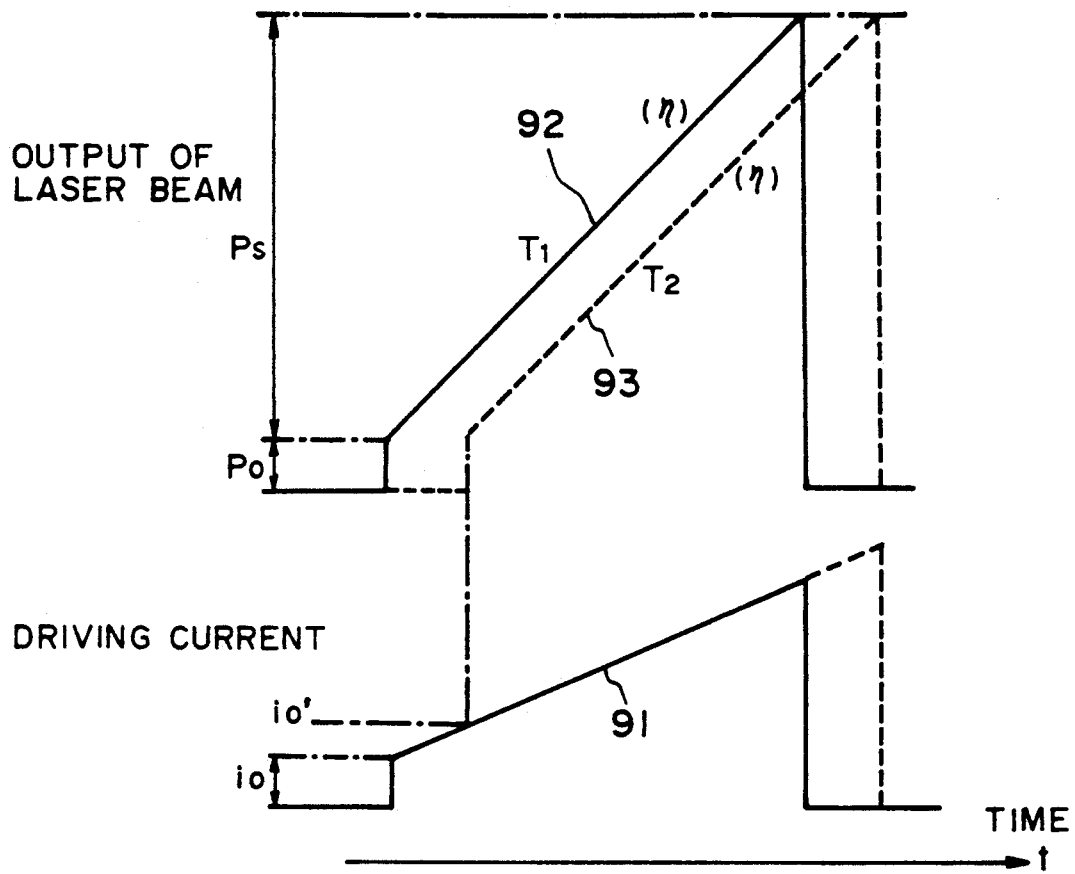
FIG. 6 is a graph for explaining the driving method of the semiconductor laser in another embodiment.

FIG. 6 shows the driving method for the semiconductor laser in the present embodiment, wherein $P_0$ is the minimum light output of the semiconductor laser, and $i_0$ is a driving current required to obtain said minimum light output $P_0$ from the semiconductor laser at a temperature $T_1$. The driving current for the semiconductor laser is linearly and gradually increased from $i_0$, and the actual light output on this time is monitored with the photodector. The current $i$ increases in proportion to time $t$ (sec), as represented by the following equation:

$$i = i_0 + kt (k: constant) \quad (1)$$

The driving current is interrupted when the light output increases by $P_s$ from $P_0$. The drive current need not be completely interrupted to zero, but can be reduced at least to a value lower than $i_0$, thereby substantially interrupting the light output. In FIG. 6, a line 91 indicates the linearly increasing drive current, and a line 92 indicates the light output at temperature $T_1$. The exposure E is obtained by the sawtooth-shaped area (time-integrated value) of the line 92, expressed by the following equation:

$$E = \frac{1}{\eta k} P_s(P_0 + P_s/2) \quad (2)$$

Now, an example is given in which the temperature of the semiconductor laser chip increases from $T_1$ (lower temperature) to $T_2$ (higher temperature). As explained above, a temperature increase does not vary the slope efficiency of the semiconductor laser but only causes a parallel displacement of the lines indicating the light output-current characteristic. In such case, the minimum light output $P_0$ does not vary but the drive current $i_0$ for obtaining said minimum light output P varies. This is approximately the current providing a light output $P_0$ in the light output-current characteristic parallel displaced to the temperature $T_2$. The drive current $i_0'$ ($>i_0$) represents a value required to obtain the light output $P_0$ at the chip temperature $T_2(>T_1)$ FIG. 6, a broken line 93 indicates the change in the light output when the drive current is linearly and gradually increased as in the equation (1). The laser oscillation starts from $i_0'$, and the drive current is interrupted when the light output increases by $P_s$. Since the slope efficiency is constant as shown in FIG. 6, the sawtooth-shaped light output represented by the broken line 93 is identical with that at the temperature $T_1$, so that the exposure is same as that represented by the equation (2).

When it is assumed that the present apparatus is applied to a laser beam printer, an exposure shown by the equation (2) is considered as the exposure for one pixel. Then, it will be understood that a temperature change in the semiconductor laser does not cause the exposure in each pixel to be changed, but slightly displaces the position and time of exposure. More specifically, an increase in temperature causes a delay in exposure time, which in turn induces a shift of the exposure position to the rear. A decrease in temperature causes the contrary results. Thus, the change in exposure resulting from temperature change can be substantially corrected if said displacement in position and time is selected within the range of a pixel and less than the resolving power of human eyes.

The exposure E may be regulated by a change in $P_s$ in the equation (2). It may also be achieved by a change in the inclination k with a constant $P_s$, or by changes in k and $P_s$. Also, as an alternative method, a light output equivalent to that in FIG. 6 may be obtained by detecting the minimum light output $P_0$ with the photodetector to vary the exposure E by controlling the modulation time t based on the timing of said detection.

According to the modulation method of the present embodiment, the light modulation is so performed that light output of the semiconductor has a non-rectangular form, which includes such one that the light output increases gradually with time. Said modulation is performed until the desired exposure is reached, whereby a desired constant exposure independent of change in temperature is obtained without use of APC. Further, a high extinction ratio is obtained, so that a halftone image with a large gradation number (for example 4096 gradation) can be obtained. If a structure same as the first embodiment is employed in the present embodiment, the extinction ratio is large to thereby obtain an image with high contrast since the minimum light quantity ($P_0$ in FIG. 6) in the gradual increase of light intensity is small. Also, if employed a structure same as the second embodiment, a large gradation number can be obtained since the resolving power of the monitoring light quantity is high.

Fourth Embodiment

The semiconductor laser driving apparatus of the foregoing embodiments are applicable to a wide range of systems employing semiconductor laser, such as an image recording apparatus, an image reading apparatus, a display apparatus, an optical communication apparatus, a memory apparatus, a laser working apparatus, various measuring apparatus or the like.

Figure 7:
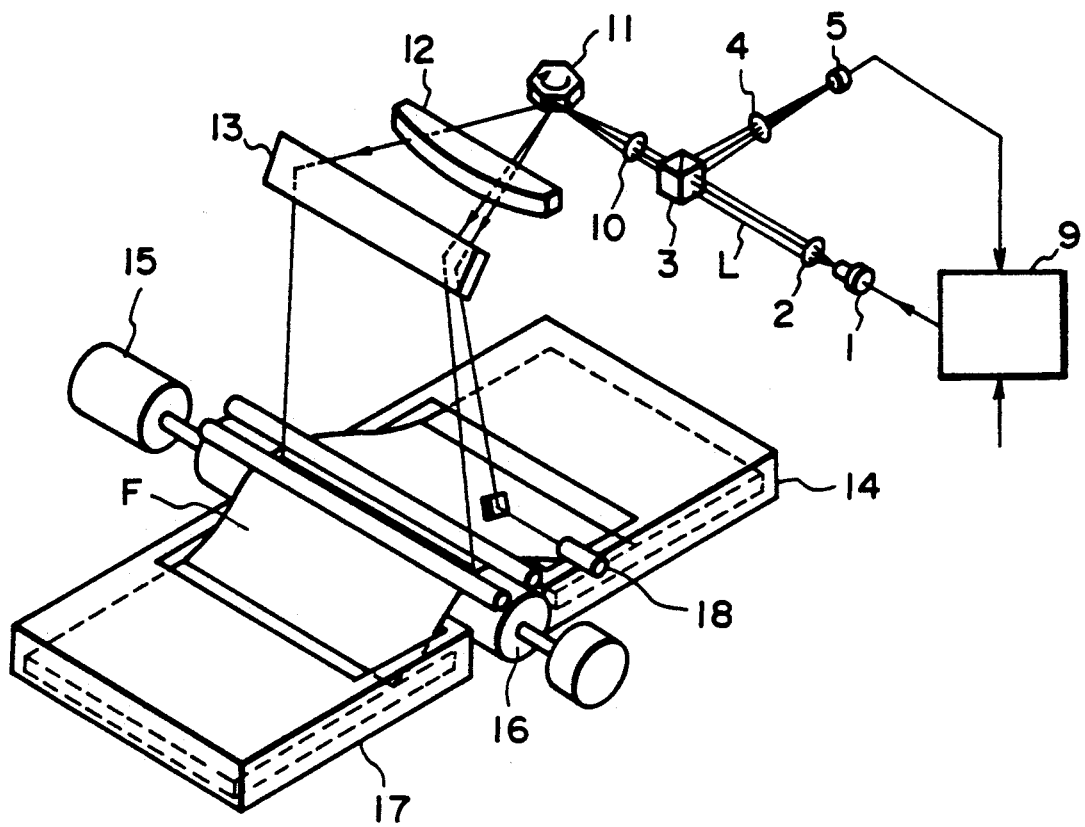
FIG. 7 is a schematic perspective view showing system structure of an embodiment.
Figure 8:
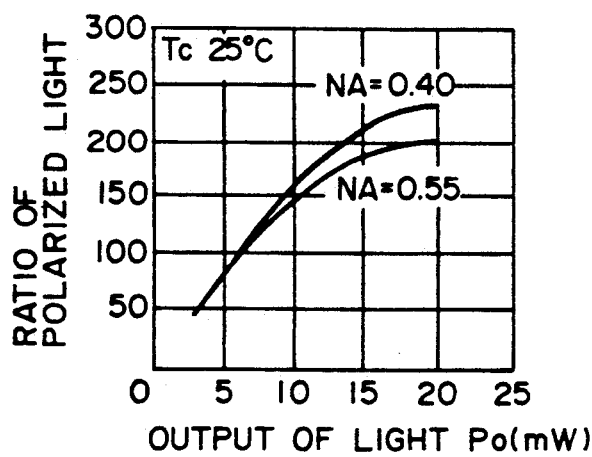
FIG. 8 is a graph showing polarization ratio of a semiconductor laser as depending on light output.
Figure 9:
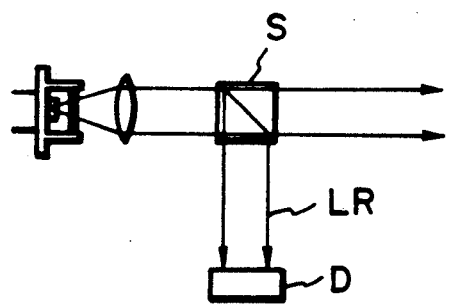
FIG. 9 is a view of a conventional structure.

FIG. 7 illustrates, as an embodiment, a laser beam printer for recording a halftone image of multiple gradation by scanning a laser beam on a recording film. Such printer is principally used in medical applications in which high image quality is required. In FIG. 7, the same components as those in FIG. 1 are represented by same numbers. The beam splitter 3 is selected in the same manner as in the first or second embodiment. A semiconductor laser controller 9 incorporates a current-voltage converter 6, a voltage comparator 7, a voltage-current converter 8, a look-up table constituting the correction means etc. shown in FIG. 1, and effects the APC control as in the first or second embodiment or the control as in the third embodiment. In a light path of the beam emitted by the semiconductor laser 1, there are provided a collimating lens 2, a beam splitter 3, a cylindrical lens 10 and a polygon mirror 11. In the reflecting direction of said polygon mirror 11, there are provided an fθ lens 12, a mirror 13 and a recording film F. In the reflecting direction of the beam splitter 3, there are provided a condenser lens 4 and a photodetector 5. The recording film F is supplied from a supply magazine 14, transmitted by a roller 16 driven by a sub scanning motor 15, and received in a receiving magazine 17. A photodetector 18 is provided for a horizontal synchronization signal.

The semiconductor laser controller 9 effects modulation by controlling the oscillation intensity of the semiconductor laser 1 according to input image recording signals. In the present embodiment, a high gray scale modulation with as many as 4096 gradation is possible. Correction means (lock-up table) in the controller 9 effects a correction so as to establish a linear relationship between the image density signals to be recorded and the image density recorded on the recording film. The non-linearity may be derived, for example, from the characteristics of the beam splitter, those of film sensitivity, those of light source and those of photodetector, but the overall synthesized characteristics are linearly corrected by said correction means.

A laser beam L having a stable intensity obtained by APC explained in the first or second embodiment, or having a gradually increasing intensity explained in the third embodiment, is focused onto the polygon mirror 11 as a line through the cylindrical lens 10, and is put into a scanning motion by the rotation of the polygon mirror 11, and then is scanned in the main scanning direction on the photosensitive surface of the recording film F through the fθ lens 12 and mirror 13. Scanning in the subscanning direction is achieved by transmitting the recording film F taken out from the supply magazine 14 in a direction substantially perpendicular to the main scanning direction by means of the sub scanning motor 15 and the roller 16. In this manner a two-dimensional latent image is recorded on the recording film F, which is subsequently stored in the receiving magazine 17.

The present embodiment is not limited to the above-explained structure for directly recording an image on the recording film F, but is likewise applicable to so-called electrophotographic printer or copying machine. In such apparatus a laser beam is main-scanned by a scanning optical system similar to that explained above to record with exposure on photosensitive drum rotated in the sub scanning direction, whereby the content of the drum is transferred onto a recording sheet or the like to obtain a hard copy.

I claim:

1. A driving apparatus for driving a light source comprising:
   light generating means including a light source which generates a light beam having first and second polarized light components, wherein the light source causes a ratio of the first and second polarized light components to vary based on intensity of the generated light beam;
   splitting means for splitting the light beam into first and second light paths, wherein said splitting means splits the first polarized light component which is included in said light beam into said first and second light paths at a rate that is different from the rate at which said splitting means splits the second polarized light component which is included in said light beam into said first and second light paths;
   detection means for detecting intensity of light in said first light path; and
   control means for controlling said light generating means based on light detection by said detection means so as to adjust intensity of light in said second light path.

2. A driving apparatus according to claim 1, wherein said control means effects feedback control of said light source so as to obtain a constant detection output from said detection means, in order to maintain a light output of said light source to be constant.

3. A driving apparatus according to claim 1, wherein said control means drives said light source based on the detection output of said detection means so that a light output of said light source is controlled to form a gradually increasing waveform until a pre-designated exposure is reached.

4. A driving apparatus according to claim 3, wherein said control means monitors a gradually increasing detection output of said detection means, and drives said light source until said detection output reaches a value corresponding to the pre-designated exposure.

5. A driving apparatus according to claim 3, wherein said control means times a detection output of said detection means, and drives said light source for a period corresponding to the pre-designated exposure, the period starting from said timed output.

6. A driving apparatus according to claim 1, further comprising correction means for correcting non-linear characteristics of said splitting means.

7. A driving apparatus according to claim 6, wherein said correction means includes a look-up table.

8. A driving apparatus according to claim 1, wherein the first polarized light component varies based on the intensity of the generated light beam at a rate which is smaller than the rate at which the second polarized light component varies, and wherein more of the first polarized light component is split into said first light path than is split into said second light path.

9. A driving apparatus according to claim 1, wherein the first polarized light component varies based on the intensity of the generated light beam at a rate which is larger than the rate at which the second polarized light component varies, and wherein more of the first polarized light component is split into said first light path than is split into said second light path.

10. A driving apparatus according to claim 1, wherein said light source includes a semi-conductor laser, the first polarized light component is perpendicular to a junction plane of an active layer of said semiconductor laser, and more of the first polarized light component is split into said first light path then is split into said second light path.

11. A driving apparatus according to claim 1, wherein said light source includes a semi-conductor laser, the first polarized light component is parallel to a junction plane of an active layer of said semiconductor laser, and more of the first polarized light component is split into said first light path than is split into said second light path.

12. An image forming system comprising:
   light generating means including a light source which generates a light beam having first and second polarized components, wherein the light source causes a ratio of the first and second polarized light components to vary based on intensity of the generated light beam;

splitting means for splitting the light beam into first and second light paths, wherein said splitting means splits the first polarized light component which is included in said light beam into said first and second light paths at a rate that is different from the rate at which said splitting means splits the second polarized light component which is included in said light beam into said first and second light paths;

detection means for detecting intensity of light in said first light path;

control means for controlling said light generating means based on light detection by said detection means so as to adjust intensity of light in said second light path; and image forming mean including a projection optical system for projecting light in said second light path onto an image receiving medium thereby to form an image on said image receiving medium.

13. An image forming system according to claim 12, wherein said image receiving medium is a recording medium on which the image is formed.

14. An image forming system according to claim 13, wherein said recording medium includes a silver halide film.

15. An image forming system according to claim 12, wherein said projection optical system includes a scanning optical system.

16. An image forming system according to claim 12, wherein said control means effects feedback control of said light source so as to obtain a constant detection output from said detection means, in order to maintain a light output of said light source to be constant.

17. An image forming system according to claim 12, wherein said control means drives said light source based on the detection output of said detection means so that a light output of said light source is controlled to form a gradually increasing waveform until a pre-designated exposure is reached.

18. An image forming system according to claims 12, wherein said control means monitors a gradually increasing detection output of said detection means, and drives said output light source until said detection output reaches a value corresponding to the pre-designated exposure.

19. An image forming system according to claim 12, wherein said control means times a detection output of said detection means, and drives said light source for a period corresponding to the pre-designated exposure, the period starting from said timed output.

20. An image forming system according to claim 12, further comprising correction means for correcting a relationship between an image signal and a density of the image formed on said image receiving medium so as to be linear.

21. An image forming system according to claim 20, wherein said correction means includes a look-up table.

22. An image forming system according to claim 12, wherein the first polarized light component varies based on the intensity of the generated light beam at a rate which is smaller than the rate at which the second polarized light component varies, and wherein more of the first polarized light component is split into said first light path than is split into said second light path.

23. An image forming system according to claim 12, wherein the first polarized light component varies based on the intensity of the generated light beam at a rate which is larger than the rate at which the second polarized light component varies, and wherein more of the first polarized light component is split into said first light path than is split into said second light path.

24. An image forming system according to claim 12, wherein said light source includes a semi-conductor laser, the first polarized light component is perpendicular to a junction plane of an active layer of said semiconductor laser, and more of the first polarized light component is split into said first light path than is split into said second light path.

25. An image forming system according to claim 12, wherein said light source includes a semi-conductor laser, the first polarized light component is parallel to a junction plane of an active layer of said semiconductor laser, and more of the first polarized light component is split into said first light path than is split into said second light path.

26. Image forming method comprising the steps of:
projecting a light beam including first and second polarized light components such that the ratio of the first polarized light components and the second polarized light component vary based on intensity of the projected light beam;

splitting the projected light beam into first and second light paths, wherein the first polarized light component which is included in said projected light beam is split into said first and second light paths at a rate that is different from the rate at which the second polarized light component which is included in said projected light beam is split into said first and second light paths;

detecting intensity of light in said first light path;

adjusting light intensity in said second light path by controlling the light beam projected in said projecting step based on detection in said detecting step; and projecting light in said second light path onto a medium for forming an image on said medium.

27. An image forming method according to claim 26, wherein the first polarized light component varies based on the intensity of the projected light beam at a rate which is smaller than the rate at which the second polarized light component varies, and wherein more of the first polarized light component is split into said first light path than is split into said second light path.

28. An image forming method according to claim 26, wherein the first polarized light component varies based on the intensity of the projected light beam at a rate which is larger than the rate at which the second polarized light component varies, and wherein more of the first polarized light component is split into said light path than is split into said second light path.

29. An image forming method according to claim 26; wherein said projecting step includes the step of projecting the light beam from a semiconductor laser, and wherein the first polarized light component is perpendicular to a junction plane of an active layer of said semiconductor laser, and more of the first polarized light component is split into said first light path than is split into said second light path.

30. An image forming method according to claim 26, wherein said projecting step includes the step of projecting the light beam from a semiconductor laser, and wherein the first polarized light component is parallel to a junction plane of an active layer of said semiconductor laser, and more of the first polarized light component is split into said first light path than is split into said second light path.

* * * * *

UNITED STATES PATENT AND TRADEMARK OFFICE
CERTIFICATE OF CORRECTION

PATENT NO. : 5,282,217
DATED : January 25, 1994
INVENTOR(S) : Tatsuya Yamazaki

It is certified that error appears in the above-indentified patent and that said Letters Patent is hereby corrected as shown below:

On the title page;

Under "Foreign Application Priority Data", insert --June 19, 1991 [JP] Japan ......... 3-174524--.

Column 4, line 25, change "monotonously" to --monotonically--;
line 26, change "monotonously" to --monotonically--; and
line 62, change "9" to --a--.

Column 7, line 56, change "output P" to --output $P_0$--.

Column 10, line 55, change "then" to --than--.

Column 11, line 41, change "claims 12" to --claim 17--; and
line 46, change "claim 12" to --claim 17--.

UNITED STATES PATENT AND TRADEMARK OFFICE
CERTIFICATE OF CORRECTION

PATENT NO. : 5,282,217
DATED : January 25, 1994
INVENTOR(S) : Tatsuya Yamazaki

It is certified that error appears in the above-indentified patent and that said Letters Patent is hereby corrected as shown below:

Column 12, line 20, change "components" to --component--; line 50, change "said light" to --said first light--.

Signed and Sealed this

Fourth Day of October, 1994

*Attest:*

*Attesting Officer*

BRUCE LEHMAN

*Commissioner of Patents and Trademarks*